US008383719B2

(12) United States Patent
Abrami et al.

(10) Patent No.: US 8,383,719 B2
(45) Date of Patent: Feb. 26, 2013

(54) WATER-BORNE POLYURETHANE COATINGS

(75) Inventors: Siamanto Abrami, Glendale, CA (US); Guangliang Tang, Glendale, CA (US)

(73) Assignee: PRC De Soto International, Inc., Sylmar, CA (US)

( * ) Notice: Subject to any disclaimer, the term of this patent is extended or adjusted under 35 U.S.C. 154(b) by 520 days.

(21) Appl. No.: 11/876,986

(22) Filed: Oct. 23, 2007

(65) Prior Publication Data

US 2010/0041818 A1 Feb. 18, 2010

(51) Int. Cl.
*C08J 3/02* (2006.01)
(52) U.S. Cl. ........ 524/501; 525/173; 524/507; 524/500; 524/539
(58) Field of Classification Search .................. 525/173; 524/501
See application file for complete search history.

(56) References Cited

U.S. PATENT DOCUMENTS

| | | | | |
|---|---|---|---|---|
| 5,665,269 | A * | 9/1997 | Hart | 252/193 |
| 5,691,410 | A | 11/1997 | Escarsega et al. | 524/591 |
| 5,693,703 | A | 12/1997 | Hart | |
| 6,096,805 | A * | 8/2000 | Lange et al. | 523/336 |
| 6,100,326 | A * | 8/2000 | Richter et al. | 524/591 |
| 6,309,707 | B1 * | 10/2001 | Mayer et al. | 427/386 |
| 6,429,256 | B1 * | 8/2002 | Vandevoorde et al. | 524/591 |
| 6,946,515 | B1 * | 9/2005 | Lettmann et al. | 524/591 |
| 6,992,133 | B2 * | 1/2006 | Yokoyama et al. | 524/601 |
| 2001/0056154 | A1 * | 12/2001 | Blum et al. | 524/522 |
| 2002/0052451 | A1 * | 5/2002 | Vandevoorde et al. | 525/533 |
| 2004/0039112 | A1 * | 2/2004 | Fenn et al. | 524/589 |
| 2006/0047064 | A1 * | 3/2006 | Murata et al. | 524/589 |
| 2006/0205857 | A1 | 9/2006 | Hofacker et al. | 524/457 |
| 2006/0216525 | A1 | 9/2006 | Huybrechts et al. | 428/423.1 |
| 2007/0055016 | A1 | 3/2007 | Niesten et al. | 525/100 |
| 2007/0142545 | A1 * | 6/2007 | Lettmann et al. | 524/589 |
| 2008/0139775 | A1 * | 6/2008 | Wu et al. | 528/44 |
| 2009/0018254 | A1 * | 1/2009 | Huster et al. | 524/507 |

FOREIGN PATENT DOCUMENTS

| | | |
|---|---|---|
| EP | 1 141 148 B1 | 4/2004 |
| WO | WO 01/98390 A1 | 12/2001 |
| WO | WO 02/053612 A2 | 7/2002 |

OTHER PUBLICATIONS

Kim, B.K. Colloid Polym Sci, vol. 274 p. 599-611, 1996.*
Melchiors, M., Sonntag, M., Kobusch, C., Jurgens, E. Progress in Organic Coatings, vol. 40, p. 99-109, 2000.*
Robert S. Henderson, "Waterborne Polyurethane Coatings: One and Two Component Systems", presented at 42$^{nd}$ Annual Technical Symposium, Waterborne Coatings, Cleveland, Ohio, Apr. 22-23, 1999.
Patricia Jacobs et al., "Two-Component Waterborne Polyurethane Coatings: Now and Into the Next Century", late 1990's.
H. Bui et al., "The Rheology of Mixing in Two-Component Waterborne Polyurethane Coatings", presented at the Waterborne, High Solids and Powder Coatings Symposium, New Orleans, LA, Feb. 5-7, 1997.
M. Dvorchak et al., "Mixing Study in Two-Component Waterborne Polyurethane Coatings with Hydrophobic and Hydrophilic Polyisocyanates", presented at the Waterborne, High Solids and Powder Coatings Symposium, New Orleans, LA, Feb. 18-20, 1998.

* cited by examiner

*Primary Examiner* — Doris Lee
(74) *Attorney, Agent, or Firm* — William R. Lambert

(57) ABSTRACT

Water-borne polyurethane coating compositions are provided. One exemplary water-borne coating composition includes a substantially water-free base component and an activator component. The substantially water-free base component includes at least a hydrophilic polyol, and the activator component includes at least a hydrophobic isocyanate.

16 Claims, No Drawings

WATER-BORNE POLYURETHANE COATINGS

STATEMENT REGARDING FEDERALLY SPONSORED RESEARCH

This invention was made with Government support under Contract No. FA8650-05-C-5010 awarded by the United States Air Force. The United States Government may have certain rights in this invention.

FIELD OF THE INVENTION

The invention is directed to water-borne polyurethane coating compositions. More particularly, the invention is directed to water-borne polyurethane coating compositions with reduced volatile organic components suitable for use in aerospace applications, among others.

BACKGROUND OF THE INVENTION

Various articles, such as aviation and aerospace vehicles, are often coated to achieve properties such as solvent resistance, fuel and hydraulic fluid resistance, weather resistance, abrasion resistance, hardness, and/or aesthetics. To that end, polyurethane coatings have been used which generally include activators, base components and thinners. Typically, the activator is an organic polyisocyanate, the base component is a hydroxyl-containing polymeric resin, and the thinner is a solvent mixture. To achieve high performance, which is required for aerospace applications by way of example, large amounts of solvent are used to balance film properties with appearance and aesthetics. The use of such large amounts of solvent, however, yields large amounts of volatile organic components ("VOC"'s), i.e. about 420 g/L in a typical solvent-borne formulation according to the Environmental Protection Agency's calculation method. Reductions in the amount of VOCs used in these formulations are desirable for ecological and economic reasons, as well as to comply with ever-changing governmental standards. Therefore, efforts have been made to replace the organic solvents in solvent-borne polyurethane coating compositions with water.

To reduce the amount of VOCs in polyurethane coatings, water-borne polyurethane coatings have been developed. However, thus far, water-borne polyurethane coatings have been unable to match the high performance of solvent-borne coatings. The performance of water-borne polyurethane coatings suffers because the water-borne polyol resin used in the coatings is dispersed in water for storage prior to combination with the activator. The water-borne polyol resin often has low molecular weight and many ester linkages, making it susceptible to hydrolysis over time. Hydrolysis decreases the overall molecular weight of the resin, yielding lower molecular weight products exhibiting poor impact resistance, pot-life, gloss, and the like. In addition, the hydrolysis rate is difficult to control under different conditions such as batch number, pH, and storage time, resulting in significant variations in film performance.

Also, water-borne polyurethane coatings are often prepared by high shear mixing a water-borne polyol resin with a hydrophilic isocyanate. High shearing energy is needed to intimately mix the hydrophilic isocyanate with the polyol resin. To overcome the barrier between the polyol resin colloid and the isocyanate, high shear energy is used to facilitate the migration of the isocyanate into a micelle of the polyol resin. The curing reaction thus occurs inside the new micelle to form the water-borne polyurethane coating composition. However, high shear mixing uses equipment, such as dissolver mixers and jet dispersing spray guns, that require high pressure and high shearing energy to intimately mix the isocyanate and polyol components. This equipment is not available for many applications; for example, the equipment is not available for fast field repair of, for example, automobiles as well as aviation and aerospace vehicles.

Finally, the polyol components of conventional water-borne polyurethane coatings include dispersions of polyols in water. As discussed above, such dispersions produce unstable polyol components because the polyols may hydrolyze into small molecules. Also, dispersion of the polyols in water makes high shear mixing necessary. In addition, polyol components often include pigments and other additives, such as aluminum powder, that are not stable in aqueous phases under storage conditions. These pigments and additives may react with water, limiting the development of the water-borne coating and adversely affecting the performance of the coating.

SUMMARY OF THE INVENTION

The present invention provides water-borne polyurethane coating compositions comprising, in one embodiment, a substantially water-free base component, an activator and water. The substantially water-free base component includes a polyol resin, and the activator includes an isocyanate. The combination of isocyanate and polyol components are just hydrophilic enough to be dispersed in an aqueous phase and form a stable dispersion for water resistance. If the components are too hydrophilic, water resistance of the cured coating will be too high and not suitable for high performance coating applications.

The substantially water-free base component includes at least a hydrophilic polyol resin, which can be any hydrophilic polyol resin. Nonlimiting examples include hydrophilic polyester polyols, hydrophilic polyether polyols, hydrophilic polyurethane polyols, hydrophilic alkyd polyols, hydrophilic caprolactone polyols, and hydrophilic acrylic polyols. According to another embodiment, the substantially water-free base component includes a mixture of hydrophobic and hydrophilic polyol resins. In this embodiment, the hydrophilic polyol resin may be present in the base component in an amount of at least about 10 wt %.

The activator may be any suitable isocyanate. For example, in one embodiment, the activator includes at least a hydrophobic isocyanate component. In another embodiment, the activator includes a mixture of hydrophobic and hydrophilic isocyanate components. When a mixture of hydrophobic and hydrophilic isocyanate components are used, the hydrophobic isocyanate component is present in an amount of at least about 30 wt %.

The coating compositions of the present invention, in certain embodiments, are three-component systems wherein the substantially water-free base component, activator and water are stored separately and are not combined until shortly before application. Because the polyol base component is stored in a substantially water-free environment, the polyol resins do not hydrolyze, thereby extending shelf stability and improving coating quality. To create such coating compositions, the polyol base component is first mixed with the activator component. Water is added after thoroughly mixing the base component and activator component to facilitate reaction of the two components. Thorough mixing of the base component and activator component improves curing and film formation, and imparts performance characteristics comparable to solvent-borne polyurethane coating compositions.

Although the water thins the composition, its primary purpose is to disperse the polyols of the base component and the isocyanates of the activator to facilitate reaction of these components. After mixing the base component, isocyanate and water, an additional thinning agent may be added to adjust the viscosity of the coating to enable easy application. This additional thinning agent may be a solvent or more water, though if a solvent is used, it is desirably only used up to an amount at which the content of VOCs in the coating composition remains low, i.e., below about 100 g/L in one embodiment, below about 70 g/L in another embodiment, and below about 50 g/L in yet another embodiment. To further minimize the amount of VOCs in the coating composition, water may be used as the thinning agent.

The water-borne coating compositions according to, certain embodiments of the present invention, exhibit performance characteristics far superior to previous water-borne compositions and comparable to their solvent-borne counterparts. In addition, certain embodiments of the inventive water-borne coating compositions have remarkably reduced VOCs and can be mixed manually, eliminating the need for high shear mixing.

DETAILED DESCRIPTION OF THE INVENTION

Water-borne polyurethane coating compositions useful for aviation, aerospace, automotive, industrial, and architectural applications, by way of example, are provided. The compositions are low in VOCs and exhibit performance characteristics comparable to those of solvent-borne polyurethane coating compositions. In one embodiment, a water-borne polyurethane coating composition is a three-component system including a substantially water-free base component, an activator and water. The substantially water-free base component includes polyol resin(s) and the activator component includes isocyanate(s). In one embodiment, the polyol resin(s) are substantially anhydrous, but in an alternate embodiment, the polyol resin(s) are completely anhydrous. The term "substantially water-free" as used herein means that the ingredients in the base component are not dispersed in water. The term "three-component system" is known in the art and refers to the separate storage of the base component and activator prior to application. The three components of the mixture are not combined until shortly before application.

The substantially water-free base component of the coating includes at least a hydrophilic polyol resin. In an alternate embodiment, however, the substantially water-free base component includes a mixture of hydrophilic polyol resins or a mixture of hydrophilic and hydrophobic polyol resins. When the substantially water-free base component includes a mixture of hydrophilic and hydrophobic polyol resins, the hydrophilic polyol resins may be present in the base component in an amount of at least about 10 wt % based on the total weight of the base component. For example, in one embodiment, the hydrophilic polyol resin is present in an amount ranging from about 10 to 80 wt % based on the total weight of the base component, and the hydrophobic polyol resin is present in an amount ranging from about 20 to 90 wt % based on the total weight of the base component.

In one embodiment, the hydrophilic polyol includes hydrophilic groups capable of rendering the polyol resin water-dispersible. Such hydrophilic polyols are well known in the art, and the hydrophilic groups can be ionic water-dispersing groups or non-ionic water-dispersing groups. The ionic water-dispersing groups may be anionic groups, nonionic groups, or a combination of anionic and nonionic groups. Cationic groups may also be used in some cases. Nonlimiting examples of suitable anionic water-dispersing groups include carboxylic groups, phosphonic groups, sulphonic acid groups, and combinations thereof. Nonlimiting examples of suitable non-ionic water-dispersing groups include polyalkylene oxide groups, for example, polyethylene oxide groups. One exemplary water-soluble resin is one having carboxyl groups, but such a group must be neutralized to an alkali salt to make it soluble in water. If a combination of anionic water-dispersing groups and non-ionic water-dispersing groups are used, neutralization may not be required. The polyol resin contains a sufficient concentration of bound hydrophilic water-dispersing groups to render the oligomer self-water-dispersible. However, to prevent compromising the water sensitivity of the final coating product, the concentration of the water-dispersing groups is kept below a level at which the oligomer would have an unacceptably high water solubility.

The hydrophilic polyol resin may be any suitable hydrophilic resin, and includes both hydroxyl groups and carboxylic groups. Nonlimiting examples of suitable hydrophilic polyol resins include polyesters, polyethers, alkyds, polyurethanes, caprolactones and acrylic polyols. In certain embodiments, the hydrophilic polyol resin has a OH (hydroxyl) number ranging from about 20 to 120 mg of KOH per gram of sample, such as about 30 to 100 mg of KOH per gram of sample. Also, the hydrophilic polyol resin, in certain embodiments, has an acid number ranging from about 10 to 90 mg of KOH per gram of sample, such as about 20 to 80 mg of KOH per gram of sample, or, in some cases, about 30 to 70 mg of KOH/g.

In certain embodiments, the hydrophilic polyol is prepared by a two-step process involving first preparing a hydrophobic hydroxyl-containing polyol having a OH number ranging from about 50 to 300 mg of KOH per gram of sample, such as about 100 to 250 mg of KOH per gram of sample. The hydrophobic hydroxyl-containing polyol also, in certain embodiments, has an acid number of less than about 5 mg of KOH per gram of sample. The hydrophobic hydroxyl-containing polyol is reacted with an anhydride to yield the desired hydrophilic polyol having a OH value ranging from about 20 to 120 mg of KOH per gram of sample and an acid number ranging from about 10 to 90 mg KOH per gram of sample. The anhydride is used in an amount sufficient to yield a polyol having the desired acid number. Any anhydride usually used for such a reaction may be used. Nonlimiting examples of suitable anhydrides include hexahydrophthalic anhydride, trimellitic anhydride, tetrahydrophthalic anhydride, succinic anhydride, and mixtures thereof. In one embodiment, the anhydride is an anhydride of a cycloaliphatic polycarboxylic acid, such as hexahydrophthalic anhydride. As an alternative to being reacted with carboxylic anhydrides, the acid groups can be incorporated in the polyol using dimethylolpropionic acid or the like.

When used, the hydrophobic polyol resin may be any suitable hydrophobic polyol resin, nonlimiting examples of which include polyesters, polyethers, polyurethanes, alkyd resins, caprolactones and acrylic polyols containing hydroxyl groups and acid groups. In certain embodiments, the hydrophobic polyol resin has a OH number ranging from about 50 to 300 mg of KOH per gram of sample, such as about 100 to 200 mg of KOH per gram of sample. Also, the hydrophobic polyol resin, in certain embodiments, has an acid number ranging from about 0 to 5 mg of KOH per gram of sample.

Although the ingredients of the base component are not dispersed in water when stored prior to combination with the activator component, the base component must be water-dispersible in order to properly react with the activator to form a coating composition. To make the substantially water-free base component dispersible in water, the hydrophilic groups are neutralized with a tertiary amine, an inorganic base, or ammonia. Nonlimiting examples of suitable tertiary amines include triethylamine, N,N-diethylethanolamine, trimethyl amine, and N,N-dimethylethanolamine. Nonlimiting examples of suitable inorganic bases include alkali hydroxides and carbonates, such as sodium hydroxide, potassium hydroxide, sodium carbonate, and sodium bicarbonate.

When a mixture of hydrophobic and hydrophilic polyol resins are used as the substantially water-free base component, the base component is prepared by admixing the hydrophobic polyol resin with the hydrophilic resin to provide the desired polyol admixture. In addition to the polyol binder, the base component may further include a solvent, a catalyst, a pigment, an additive, or the like. In addition to being added to the base component, solvent may be added to the activator, as discussed further below.

When solvent is added to either the base component or the activator, it is often desirable to only use relatively small amounts in order to minimize the VOCs in the resulting coating composition. The added solvent often serves to reduce viscosity, control film formation, and/or eliminate certain film defects. For example, the added solvent can wet the primer surface, lower the surface tension of the coating, dissolve the binder resin of the coating, facilitate mixing, control film formation, provide an environment for the curing reaction, and/or adjust application time and pot-life of the resulting coating. Nonlimiting examples of suitable organic solvents include aliphatic hydrocarbons, aromatic hydrocarbons, ketones, and esters. Nonlimiting examples of suitable aliphatic hydrocarbons include hexane, heptane, octane, and the like. Nonlimiting examples of suitable aromatic hydrocarbons include benzene, toluene, xylene, and the like. Nonlimiting examples of suitable ketones include methyl isobutyl ketone, diisobutyl ketone, methyl ethyl ketone, methyl hexyl ketone, ethyl butyl ketone, and the like. Nonlimiting examples of suitable esters include ethyl acetate, isobutyl acetate, amyl acetate, 2-ethylhexyl acetate, and the like. A mixture of solvents may be used to optimize coating characteristics such as adhesion and appearance properties. When used, the solvent is sometimes present in an amount ranging from about 1 to 3 weight percent, such as about 1 to 2 weight percent, based on the total weight of the coating composition.

The coating composition may further include conventional additives for coating compositions, such as pigments, fillers, UV absorbers, flow aids, rheology control agents, and catalysts for the curing reaction. Catalysts promote the curing reaction and may be tertiary amines, metal compound catalysts, or combinations thereof. Nonlimiting examples of suitable tertiary amine catalysts include triethylamine, N-methylmorpholine, triethylenediamine, pyridine, picoline, and the like. Nonlimiting examples of suitable metal compound catalysts include compounds of lead, zinc, cobalt, titanate, iron, copper, and tin. For example, the metal compound catalyst may be lead 2-ethylhexoate, zinc 2-ethylhexoate, cobalt naphthenate, tetraisopropyl titanate, iron naphthenate, copper naphthenate, dibutyl tin diacetate, dibutyl tin dioctate, dibutyl tin dilaurate, and the like.

When used, the catalyst is present in a total amount ranging from about 0.001 to 0.05 weight percent based on the total weight of the resin solids in the coating composition. For example, the catalyst may be present in an amount ranging from about 0.005 to 0.02 weight percent based on the total weight of the resin solids in the coating composition.

The term "pigment" includes fillers and extenders as well as conventional pigments. Pigments are particulate materials which impart color or opacity to the final coating composition. Extenders and fillers are usually inorganic materials which can be used to reduce the cost of a formulation or to modify its properties. Nonlimiting examples of suitable pigments include carbon black, titanium dioxide, calcium carbonate, ferric oxide, aluminum silicate, barium sulfate, and color pigments. When used, the pigments are sometimes present in an amount ranging from about 10 to 50 weight percent, such as about 20 to 40 weight percent, based on the total solids weight of the coating composition.

The activator includes at least a hydrophobic isocyanate. However, in an alternative embodiment, the activator can include a mixture of hydrophilic and hydrophobic isocyanates. The hydrophobic isocyanate has two or more isocyanate groups, i.e. the isocyanate may be selected from dimers, trimers, adducts, polymeric and prepolymeric isocyanates. The hydrophobic isocyanate may include aromatic isocyanates, aliphatic isocyanates, or combinations thereof. Nonlimiting examples of suitable aromatic isocyanates include toluene 2,4-diisocyanate, toluene 2,6-diisocyanate, 4,4'-methylene diphenyl diisocyanate, 2,4'-methylene diphenyl diisocyanate, polymeric methylene diisocyanate, p-phenylene diisocyanate, m-phenylene diisocyanate, naphthalene 1,5-diisocyanate, naphthalene 2,4-diisocyanate, 1,5-naphthalene diisocyanate, p-xylylene diisocyanate, and the like. Nonlimiting examples of suitable aliphatic isocyanates include isophorone diisocyanate, 1,4-cyclohexane diisocyanate, 4,4'-dicyclohexylmethane diisocyanate, bis(isocyanatomethyl) cyclohexane, tetramethylxylylene diisocyanate, 1,6-hexamethylene diisocyanate, and the like. Many of these isocyanates are commercially available from companies such as Bayer Corporation, BASF, ICI, Dow, Huntsman, and Degussa.

Nonlimiting examples of suitable hydrophilic isocyanates include isocyanates containing polyethylene oxide groups, sulphonate salt groups, or the like. These isocyanates may also be selected from dimers, trimers, adducts, polymeric and prepolymeric isocyanates. Suitable hydrophilic isocyanates are commercially available from companies such as Bayer Corporation, BASF, ICI, Dow, Huntsman, and Degussa. For example, suitable commercial products include Bahydur 302, XP7156, VPLS2319, VPLS2336, XP2570, all of which are commercially available from Bayer Corporation.

As noted above, a small amount of organic solvent may be added to the activator component to adjust viscosity. Suitable solvents for this purpose are the same as those listed above in connection with the base component. When used, the solvent is present in the activator component up to an amount sufficient to render a coating composition with an amount of VOCs less than about 100 g/L in one embodiment, less than about 70 g/L in another embodiment, and less than about 50 g/L in yet another embodiment. In one embodiment, for example, the solvent may be present in the activator component in an amount ranging from about 0.5 to 1% by weight based on the total weight of the polyisocyanates The amounts of the base component and activator component in the coating composition are selected such that a ratio of isocyanate groups to hydroxyl groups ranges from about 3:1 to 1:1, such as about 2:1 to 1:1.

In addition to the substantially water-free base component and activator component, in some embodiments the waterborne polyurethane coating further comprises a thinning agent. The thinning agent serves to adjust application viscosity and provides an environment for film formation and curing. In one embodiment, the thinning agent contains at least a rheology controlling additive. If desired, however, the thinning agent can also contain auxiliary substances and additives, one or more acrylic polyol emulsions, and organic solvents.

To prepare the water-borne polyurethane coating composition, the base component and activator component, and if used, the thinning agent, are mixed by a simple mechanical mixing process or by hand mixing. The individual components are maintained separately until shortly prior to application. The activator component and base component are mixed first, followed by the addition of the thinning agent, when used, resulting in an emulsion micelle containing both isocyanates and polyols.

The coating compositions of the present invention can be applied using any suitable coating method, and can be applied to any suitable dry film thickness.

For example, in certain embodiments, the coating composition is applied to a dry film thickness ranging from about 1 mil to 6 mils. In one embodiment, the coating composition is applied to a dry film thickness ranging from about 2 mils to 4 mils.

The coating compositions of the present invention can be applied by brushing, spraying, dipping, rolling, flowing, and the like. Upon application, film formation can be achieved with or without heating. The coating composition develops excellent film performance after being cured at ambient temperature for at least about one week, or for about 24 hours at 60° C. In certain embodiments, the coating composition is dry to tape in from about 8 to 24 hours.

The coating compositions of the present invention may be applied to any suitable substrates, often on a primer and may be used as a topcoat, basecoat, or clearcoat. Alternatively, the coating compositions may be used as a one-coat system, eliminating the need for a separate topcoat, basecoat and/or clearcoat.

Suitable substrates include, without limitation, metallic and polymeric substrates. Suitable metallic substrates include, but are not limited to, foils, sheets, or workpieces constructed of, for example, cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Also, suitable metallic substrates include silver, gold, and alloys thereof.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

As will be appreciated, the present invention is also directed to substrates at least partially coated with a coating deposited from a coating composition of the present invention, as well as related methods for coating a substrate utilizing a coating composition of the present invention.

EXAMPLES

The following non-limiting examples illustrate exemplary compositions of water-borne polyurethane coating compositions according to the present invention. In the examples and comparative examples, the raw materials listed in the following Table 1 can be described as shown:

TABLE 1

| RAW MATERIAL | DESCRIPTION | SUPPLIER |
| --- | --- | --- |
| Lexorez 1405-65 | Acid polyester polyol resin | Inolex Chemical Company |
| K-Flex 188 | Polyester polyol | King Industries |
| K-Flex XMA308 | Polyester polyol | King Industries |
| CAPA 4101 | Caprolactone polyol | Solvay Caprolactones |
| Desmophen 365 | Acrylic polyol resin | Bayer Material Science |
| Bayhydrol XP2470 | Water-borne acrylic polyol | Bayer Material Science |
| Bayhydrol XP7093 | Water-borne polyester polyol | Bayer Material Science |
| Desmodur XP2410 | Hydrophobic polyisocyanate | Bayer Material Science |
| Bayhydur VP LS2319 | Hydrophilic polyisocyanate | Bayer Material Science |
| Bayhydur XP2570 | Hydrophilic polyisocyanate | Bayer Material Science |
| Triethylamine | Amine | Aldrich |
| Acetone | Exempt solvent | Aldrich |
| Tert-butyl acetate | Exempt solvent | Lyondell |
| Proglyde DMM | Solvent | Dow Chemical Company |
| Methyl propyl ketone | Solvent | Eastman Chemical Company |
| Methyl amyl ketone | Solvent | Eastman Chemical |
| Baysilone Additive 3468 | Flow additive | Lanxess Corporation |
| Tinuvin 1130 | UV stabilizer | Ciba Specialty Chemical |
| Tinuvin 292 | UV stabilizer | Ciba Specialty Chemical |
| Surfynol 104BC | Wetting additive | Airproducts |
| Byk-345 | Wetting additive | BYK-Chemie |
| Borchi Gel PW25 | Rheological additive | Lanxess Corporation |
| Ti-Pure R706 | $TiO_2$ | DuPont |
| Aerosil R942 | $SiO_2$ | Degussa Corporation |

Comparative Examples

The water-borne coating compositions according to Comparative Examples 1 and 2 below were prepared by separately preparing and storing the base component, the activator component and the thinning agent. Shortly before application of the coating composition, the base component was mixed with the activator component using high shear mixing equipment. The thinning agent was then added and the mixture was mixed again. The resulting composition was applied by, for example, spraying it through a HVLP (high volume, low pressure) spray gun onto an aluminum substrate coated with CA7700 primer available from PRC-DeSoto Int., Inc.

Comparative Example 1

A water-borne polyurethane coating was prepared having the composition listed in Table 2. This coating had a VOC level of 99.66 g/L and a non-volatile matter ("NVM") level of 49.96%.

TABLE 2

| | Weight Percent |
|---|---|
| Base component | |
| DI water | 5.49 |
| BYK-011 | 0.65 |
| DisperBYK-190 | 1.83 |
| Ti-Pure R706 | 20.33 |
| Aerosil R942 | 0.09 |
| Byk-345 | 0.51 |
| Borchigel PW25 | 0.13 |
| Baysilone Additive 3468 | 0.46 |
| Bayhydrol XP2470 | 33.18 |
| DI water | 3.04 |
| Activator Component | |
| Desmodur XP2410 | 6.00 |
| Bayhydur XP2570 | 7.02 |
| Proglyde DMM | 0.51 |
| Thinning Agent | |
| DI water | 20.78 |

Comparative Example 2

A water-borne polyurethane coating was prepared having the composition listed in Table 3. This coating had a VOC level of 24.46 g/L and a NVM level of 49.45%.

TABLE 3

| | Weight Percent |
|---|---|
| Base Component | |
| DI water | 5.29 |
| BYK-011 | 0.58 |
| DisperBYK-190 | 3.23 |
| Ti-Pure R706 | 20.58 |
| Baysilone Additive 3468 | 0.40 |
| Bayhydrol XP2470 | 1.70 |
| Bayhydrol XP7093 | 39.58 |
| DI water | 9.04 |
| Activator component | |
| Desmodur XP2410 | 6.81 |
| Bayhydur XP2570 | 7.12 |
| Thinning Agent | |
| DI water | 5.65 |

Examples

The water-borne coating compositions according to the following Examples 1 through 7 were prepared by separately preparing and storing the base component, the activator component and the thinning agent. Shortly before application of the coating composition to a substrate, the base component was manually mixed with the activator component using, for example, a spatula. The thinning agent was then added and the mixture was manually mixed again. Each resulting composition was applied by, for example, spraying it through a HVLP (high volume, low pressure) spray gun onto an aluminum substrate coated with CA7700 primer available from PRC-DeSoto Int., Inc. The applied coating was then cured at ambient temperature for about one week.

Example 1

A water-borne polyurethane coating was prepared having the composition listed in Table 4. This coating had a VOC level of 43.50 g/L and a NVM level of 66.5%.

TABLE 4

| | Weight Percent |
|---|---|
| Base Component | |
| Lexorez 1405-65 | 11.51 |
| K-Flex XMA308 | 11.51 |
| Triethylamine | 1.18 |
| Proglyde DMM | 1.55 |
| Activator Component | |
| Desmodur XP2410 | 9.43 |
| Bayhydur XP2570 | 11.04 |
| Thinning Agent | |
| DI water | 53.75 |

Example 2

A water-borne polyurethane coating was prepared having the composition listed in Table 5. This coating had a VOC level of 69.60 g/L and a NVM level of 42.34%.

TABLE 5

| | Weight Percent |
|---|---|
| Base Component | |
| Lexorez 1405-65 | 11.75 |
| K-Flex 188 | 11.75 |
| Triethylamine | 1.20 |
| Proglyde DMM | 1.59 |
| Activator Component | |
| Desmodur XP2410 | 8.68 |
| Bayhydur XP2570 | 10.16 |
| Thinning Agent | |
| DI water | 54.87 |

Example 3

A water-borne polyurethane coating was prepared having the composition listed in Table 6. This coating had a VOC level of 50.42 g/L and a NVM level of 62.20%.

TABLE 6

| | Weight Percent |
|---|---|
| Base Component | |
| Lexorez 1405-65 | 8.18 |
| K-Flex XMA308 | 8.18 |
| Triethylamine | 0.83 |
| Methyl propyl ketone | 0.98 |
| Ti Pure R760 | 32.72 |
| Activator Component | |
| Desmodur XP2410 | 6.04 |
| Bayhydur XP2570 | 7.08 |
| Thinning Agent | |
| DI water | 35.99 |

Example 4

A water-borne polyurethane coating was prepared having the composition listed in Table 7. This coating had a VOC level of 50.44 g/L and a NVM level of 62.20%.

TABLE 7

|  | Weight Percent |
| --- | --- |
| Base Component | |
| Lexorez 1405-65 | 8.18 |
| K-Flex XMA308 | 8.18 |
| Triethylamine | 0.83 |
| Methyl amyl ketone | 0.98 |
| Ti Pure R760 | 32.72 |
| Activator Component | |
| Desmodur XP2410 | 6.04 |
| Bayhydur XP2570 | 7.08 |
| Thinning Agent | |
| DI water | 35.99 |

Example 5

A water-borne polyurethane coating was prepared having the composition listed in Table 8. This coating had a VOC level of 49.59 g/L and a NVM level of 62.00%.

TABLE 8

|  | Weight Percent |
| --- | --- |
| Base Component | |
| Lexorez 1405-65 | 5.13 |
| Desmophen 365 | 2.77 |
| K-Flex XMA308 | 10.40 |
| Triethylamine | 0.57 |
| Methyl amyl ketone | 0.35 |
| Ti Pure R760 | 26.34 |
| Activator Component | |
| Desmodur XP2410 | 7.48 |
| Bayhydur XP2570 | 8.77 |
| Thinning Agent | |
| DI water | 38.12 |

Example 6

A water-borne polyurethane coating was prepared having the composition listed in Table 9. This coating had a VOC level of 70.80 g/L and a NVM level of 52.80%.

TABLE 9

|  | Weight Percent |
| --- | --- |
| Base Component | |
| Lexorez 1405-65 | 3.96 |
| Desmophen 365 | 2.11 |
| CAPA 4101 | 2.64 |
| K-Flex XMA308 | 5.28 |
| Triethylamine | 0.43 |
| Acetone | 0.99 |
| Baysilone Additive 3468 | 0.13 |
| Surfynol 104BC | 0.13 |
| Ti-Pure R706 | 7.39 |
| Activator Component | |
| Desmodur XP2410 | 9.16 |
| Bayhydur VP LS2319 | 12.41 |
| Thinning Agent | |
| Bayhydrol XP2470 | 2.43 |
| Borchi Gel PW25 | 0.23 |
| DI water | 31.68 |

Example 7

A water-borne polyurethane coating was prepared having the composition listed in Table 10. This coating had a VOC level of 69.60 g/L and a NVM level of 47.89%.

TABLE 10

|  | Weight Percent |
| --- | --- |
| Base Component | |
| Lexorez 1405-65 | 3.60 |
| Desmophen 365 | 1.58 |
| Solsperse 39000 | 0.18 |
| K-Flex XMA308 | 5.67 |
| Triethylamine | 0.39 |
| Tert-Butyl acetate | 4.44 |
| Tinuvin 1130 | 0.64 |
| Tinuvin 292 | 0.32 |
| Baysilone Additive 3468 | 0.10 |
| Surfynol 104BC | 0.10 |
| Ti-Pure R706 | 14.79 |
| Activator Component | |
| Desmodur XP2410 | 13.56 |
| K-Kat XC6212 | 0.14 |
| Thinning Agent | |
| Bayhydrol XP2470 | 17.74 |
| Borchi Gel PW25 | 0.44 |
| DI water | 36.47 |

Testing and Results

As shown in the above Examples, the VOC level of the resulting coating composition may be controlled by adjusting the amounts and contents of the base component, activator component and thinning agent. Accordingly, in some embodiments, the coating compositions have VOC levels of less than about 100 g/L, for example, as shown in Example 6. In other embodiments, the coating compositions have VOC levels of less than about 70 g/L, for example, as shown in Examples 2, 3, 4 and 7. In yet other embodiments, the coating compositions have VOC levels of less than about 50 g/L, for example, as shown in Examples 1 and 5.

The Examples and Comparative Examples were tested to ascertain various performance characteristics, including tape adhesion, haze and specular gloss (measured at incident angles of 20° and 60°), MEK (methyl ethyl ketone) resistance, set-to-touch time, impact resistance, hot water resistance and skydrol resistance. In addition, the NVM percentage and VOC level in g/L were determined for each Example and Comparative Example. The NVM percentage was determined according to ASTM D2369, and the VOC level was determined according to ASTM D3960. The NVM percentages and VOC levels for the Examples and Comparative Examples are reported above.

Tape Adhesion

Tape adhesion was determined according to ASTM D3359 and the results are reported in Table 11.

TABLE 11

| SAMPLE | TAPE ADHESION |
| --- | --- |
| Comparative Example 1 | 5B |
| Comparative Example 2 | 5B |
| Example 1 | 5B |
| Example 2 | 5B |
| Example 3 | 5B |
| Example 4 | 5B |
| Example 5 | 5B |
| Example 6 | 5B |
| Example 7 | 5B |

Haze and Specular Gloss

Haze and Specular Gloss were determined according to ASTM E430 and D523 using a BYK-Gardner Haze-Gloss and the results are reported in Table 12.

TABLE 12

| SAMPLE | Haze | 20° | 60° |
| --- | --- | --- | --- |
| Comparative Example 1 | 29.1 | 77.5 | 87.3 |
| Comparative Example 2 | 36.8 | 77.9 | 87.0 |
| Example 1 | 8.4 | 83.0 | 89.9 |
| Example 2 | 8.8 | 83.1 | 90.7 |
| Example 3 | 16.1 | 80.5 | 90.5 |
| Example 4 | 3.6 | 82.8 | 92.8 |
| Example 5 | 4.6 | 85.1 | 93.8 |
| Example 6 | 6.3 | 84.2 | 93.4 |
| Example 7 | 2.8 | 83.7 | 92.4 |

MEK Resistance

MEK resistance was determined according to ASTM D5402 over 200 MEK double rubs, and the results are reported in Table 13.

TABLE 13

| SAMPLE | MEK RESISTANCE |
| --- | --- |
| Comparative Example 1 | Pass |
| Comparative Example 2 | Pass |
| Example 1 | Pass |
| Example 2 | Pass |
| Example 3 | Pass |
| Example 4 | Pass |
| Example 5 | Pass |
| Example 6 | Pass |
| Example 7 | Pass |

Set to Touch Time

Set-to-touch time was determined according to ASTM D1640 and the results are reported in Table 14.

TABLE 14

| SAMPLE | SET-TO-TOUCH TIME |
| --- | --- |
| Comparative Example 1 | 2 hours |
| Comparative Example 2 | 8 hours |
| Example 1 | 12 hours |
| Example 2 | 12 hours |
| Example 3 | 12 hours |
| Example 4 | 12 hours |
| Example 5 | 12 hours |
| Example 6 | 4 to 6 hours |
| Example 7 | 4 to 6 hours |

Impact Resistance

Impact resistance was determined according to ASTM D2794 using a BYK-Gardner Impact Tester and the results are reported in Table 15.

TABLE 15

| SAMPLE | IMPACT RESISTANCE (direct/reverse) |
| --- | --- |
| Comparative Example 1 | 20/10 in-lb |
| Comparative Example 2 | 80/80 in-lb |
| Example 1 | 100/100 in-lb |
| Example 2 | 100/100 in-lb |
| Example 3 | 100/100 in-lb |
| Example 4 | 100/100 in-lb |
| Example 5 | 100/100 in-lb |
| Example 6 | 100/100 in-lb |
| Example 7 | 100/100 in-lb |

Hot Water Resistance

Hot water resistance was determined according to ASTM D870. Each sample was immersed in deionized water at 158° F. for 24 hours. The results are reported in Table 16.

TABLE 16

| SAMPLE | HOT WATER RESISTANCE |
| --- | --- |
| Comparative Example 1 | Pass |
| Comparative Example 2 | Pass |
| Example 1 | Pass |
| Example 2 | Pass |
| Example 3 | Pass |
| Example 4 | Pass |
| Example 5 | Pass |
| Example 6 | Pass |
| Example 7 | Pass |

Skydrol Resistance

Skydrol resistance was determined according to ASTM D870. Each sample was immersed in Skydrol LD-4 hydraulic fluid (available from Solutia, Inc.) at 158° F. for 24 hours. The results are reported in Table 17.

TABLE 17

| SAMPLE | SKYDROL RESISTANCE |
| --- | --- |
| Comparative Example 1 | Pass |
| Comparative Example 2 | Pass |
| Example 1 | Pass |
| Example 2 | Pass |
| Example 3 | Pass |
| Example 4 | Pass |
| Example 5 | Pass |
| Example 6 | Pass |
| Example 7 | Pass |

As seen from the test results, the water-borne coating compositions according to Examples 1 through 7 have dramatically reduced VOC levels compared to Comparative Example 1, which includes a base component dispersed in water. In addition, the water-borne compositions according to Examples 1 through 7 have significantly improved performance characteristics. For example, the water-borne compositions according to Examples 1 though 7 exhibit surprisingly better impact resistance and specular gloss than the compositions according to Comparative Examples 1 and 2. Also, although the composition according to Comparative Example 2 has a lower VOC level, it exhibits much poorer performance characteristics as compared to the compositions according to Examples 1 through 7. The compositions according to Examples 1 through 7 were able to couple a very low VOC level with excellent performance characteristics, a feat previously unattainable in a water-borne coating composition.

Moreover, the water-borne coating compositions according to Examples 1 through 7 exhibit performance characteristics similar to those of conventional solvent-borne coating compositions. In particular, one commercially available solvent-borne coating composition is CA8000, available from PRC-DeSoto Int., Inc. The haze and 20° specular gloss, at 10.5/83.6, of this solvent-borne coating composition are very similar to the values reported above for the water-borne compositions according to Examples 1 through 7. Also, the impact resistance of this solvent-borne composition, at 100/100 in-lb, is the same as that reported for the water-borne compositions according to Examples 1 through 7. Accordingly, the water-borne compositions of the present invention not only have reduced VOCs, but also dramatically improved performance characteristics as compared to conventional water-borne compositions, at last matching the performance of their solvent-borne counterparts and meeting the high performance requirements of the aerospace industry, for example.

The present invention has been described with reference to exemplary embodiments and aspects, but is not limited thereto. Persons skilled in the art will appreciate that other modifications and applications can be made without meaningfully departing from the invention. For example, the coating compositions are described as being mixed by a simple mechanical mixing process, or by hand mixing. However, it is understood that other mixing processes may also be used to mix the coating compositions of the present invention. Also, although the coating compositions are described as being useful for aerospace applications, they may be useful for other applications as well. Accordingly, the foregoing description should not be read as limited to the precise embodiments and aspects described, but should be read consistent with and as support for the following claims, which are to have their fullest and fairest scope.

Throughout the text and the claims, use of the word "about" in relation to a range of values is intended to modify both the high and low values recited, and reflects the penumbra of variation associated with measurement, significant figures, and interchangeability, all as understood by a person having ordinary skill in the art to which this invention pertains.

What is claimed is:

1. A water-borne coating composition comprising:
   a water-free base component comprising:
      0 wt % to 1.8 wt % of a hydrophobic acrylic polyol resin;
      3.6 wt % to 11.7 wt % of a hydrophilic polyester polyol resin;
      5.7 wt % to 11.7 wt % of a hydrophobic polyester polyol resin; and
      0.35 wt % to 4.44 wt % of an organic solvent;
   an activator component comprising:
      6 wt % to 13.6 wt % of a hydrophobic polyisocyanate; and
      0 wt % to 12.4 wt % of a hydrophilic polyisocyanate; and
      0 wt % of an organic solvent; and
   a thinning agent comprising:
      0 wt % to 17.7 wt % of a hydrophilic acrylic polyol resin;
      31.7 wt % to 54.9 wt % water; and
      0 wt % of an organic solvent;
   wherein wt % is based on the total weight of the composition, wherein the composition has a volatile organic component (VOC) from 43.5 g/L to 70.8 g/L and a non-volatile matter (NVM) from 42.3% to 66.5%.

2. The composition of claim 1, wherein the hydrophilic polyester polyol resin has a OH number ranging from 20 mg to 120 mg of KOH per gram, and an acid number ranging from 10 mg to 90 mg of KOH per gram.

3. The composition of claim 1, wherein the hydrophobic acrylic polyol resin and the hydrophobic polyester polyol resin have a OH number ranging from 50 mg to 300 mg of KOH per gram of sample and an acid number ranging from 0 mg to 5 mg of KOH per gram.

4. The composition of claim 1, wherein the polyol content of the composition comprises:
   0 wt % to 43.7 wt % of a hydrophilic acrylic polyol;
   0 wt % to 10.4 wt % of a hydrophobic acrylic polyol;
   19.7 wt % to 50 wt % of a hydrophilic polyester polyol; and
   31 wt % to 60 wt % of a hydrophobic polyester polyol;
   wherein wt % is based on the total weight of the polyol in the composition.

5. The composition of claim 1, wherein the polyisocyanate content of the composition comprises:
   0 wt % to 57.5 wt % of a hydrophilic polyisocyanate; and
   42.5 wt % to 100 wt % of a hydrophobic polyisocyanate;
   wherein wt % is based on the total weight of the polyisocyanate in the composition.

6. The composition of claim 1, comprising:
   a total polyol content of 14.4 wt % to 23.4 wt %;
   a total polyisocyanate content of 13.1 wt % to 21.6 wt %; and
   a total water content of 31.7 wt % to 54.9 wt %;
   wherein wt % is based on the total weight of the composition.

7. A coating formed using the composition of claim 1.

8. The coating of claim 7, having a dry film thickness from 1 mil to 6 mils.

9. The coating of claim 7, wherein the coating is thermally cured at a temperature from 25° C. to 60° C.

10. A water-borne coating composition comprising:
    a water-free base component comprising:
       0 wt % to 10.4 wt % of a hydrophobic acrylic polyol;
       19.7 wt % to 50 wt % of a hydrophilic polyester polyol; and
       31 wt % to 60 wt % of a hydrophobic polyester polyol;
       wherein wt % is based on the total weight of the polyol in the composition;
    an activator component comprising:
       0 wt % to 57.5 wt % of a hydrophilic polyisocyanate; and
       42.5 wt % to 100 wt % of a hydrophobic polyisocyanate;
       wherein wt % is based on the total weight of the polyisocyanate in the composition; and
    a thinning agent comprising:
       water; and
       0 wt % to 43.7 wt % of a hydrophilic acrylic polyol;
       wherein wt % is based on the total weight of the polyol in the composition;
    wherein the coating composition comprises 0.35 wt % to 4.44 wt % of an organic solvent wherein wt % is based on the total weight of the composition, and the organic solvent is contained in the base component, wherein the composition has a volatile organic component (VOC) from 43.5 g/L to 70.8 g/L and a non-volatile matter (NVM) from 42.3% to 66.5%.

11. The composition of claim 10, comprising:
    a total polyol content of 14.4 wt % to 23.4 wt %;
    a total polyisocyanate content of 13.1 wt % to 21.6 wt %; and
    a total water content of 31.7 wt % to 54.9 wt %;
    wherein wt % is based on the total weight of the composition.

12. The composition of claim 10, wherein the hydrophilic polyester polyol resin has a OH number ranging from 20 mg to 120 mg of KOH per gram, and an acid number ranging from 10 mg to 90 mg of KOH per gram.

13. The composition of claim 10, wherein the hydrophobic acrylic polyol resin and the hydrophobic polyester polyol resin have a OH number ranging from 50 mg to 300 mg of KOH per gram of sample and an acid number ranging from 0 mg to 5 mg of KOH per gram.

14. A coating formed using the composition of claim 10.

15. The coating of claim 14, having a dry film thickness from 1 mil to 6 mils.

16. The coating of claim 14, wherein the coating is thermally cured at a temperature from 25° C. to 60° C.

* * * * *